United States Patent
Subramanian et al.

(10) Patent No.: US 11,663,125 B2
(45) Date of Patent: May 30, 2023

(54) CACHE CONFIGURATION PERFORMANCE ESTIMATION

(71) Applicant: Arm Limited, Cambridge (GB)

(72) Inventors: Varun Subramanian, Littleton, MA (US); Emmanuel Manrico III Mendoza, Cambridge (GB)

(73) Assignee: ARM LIMITED, Cambridge (GB)

( * ) Notice: Subject to any disclaimer, the term of this patent is extended or adjusted under 35 U.S.C. 154(b) by 1407 days.

(21) Appl. No.: 15/987,944

(22) Filed: May 24, 2018

(65) Prior Publication Data

US 2019/0361808 A1    Nov. 28, 2019

(51) Int. Cl.
| | |
|---|---|
| *G06F 12/0802* | (2016.01) |
| *G06N 3/04* | (2023.01) |
| *G06N 20/00* | (2019.01) |
| *G06N 3/08* | (2023.01) |
| *G06N 3/02* | (2006.01) |
| *G06F 11/34* | (2006.01) |

(52) U.S. Cl.
CPC ...... *G06F 12/0802* (2013.01); *G06F 11/3447* (2013.01); *G06F 11/3457* (2013.01); *G06N 3/02* (2013.01); *G06N 3/04* (2013.01); *G06N 3/08* (2013.01); *G06N 20/00* (2019.01); *G06F 2212/1012* (2013.01); *G06F 2212/1028* (2013.01); *G06F 2212/452* (2013.01)

(58) Field of Classification Search
CPC ............. G06F 12/0802; G06F 11/3447; G06F 11/3448; G06F 11/3449; G06F 11/3461; G06F 11/3471; G06F 11/3476; G06F 11/3495; G06F 11/3457; G06F 2212/1012; G06F 2212/1028; G06F 2212/452; G06F 2212/601; G06F 11/3037; G06F 11/3409; G06F 12/0897; G06N 3/02; G06N 3/04; G06N 3/08; G06N 20/00

See application file for complete search history.

(56) References Cited

U.S. PATENT DOCUMENTS

2012/0029900 A1*  2/2012  Papariello ............... G06F 30/33
                                                          703/21

OTHER PUBLICATIONS

Zhang, Changshu, "A Machine Learning Approach to Modeling Power and Performance of Chip Multiprocessors," IEEE, (Year: 2011).*

(Continued)

*Primary Examiner* — Omar F Fernandez Rivas
*Assistant Examiner* — Shamcy Alghazzy
(74) *Attorney, Agent, or Firm* — Nixon & Vanderhye, P.C.

(57) ABSTRACT

Computer-implemented methods using machine learning are provided for generating an estimated cache performance of a cache configuration. A neural network is trained using, as inputs, a set of memory access parameters generated from a non-cycle-accurate simulation of a data processing system comprising the cache configuration and a cache configuration value, and using, as outputs, cache performance values generated by a cycle-accurate simulation of the data processing system comprising the cache configuration. The trained neural network is then provided with sets of memory access parameters generated from a non-cycle-accurate simulation of a proposed data processing system and a selected cache configuration and generates estimated cache performance values for that selected cache configuration.

14 Claims, 9 Drawing Sheets

(56) References Cited

OTHER PUBLICATIONS

Min, Su Myat, "Realizing Cycle Accurate Processor Memory Simulation via Interface Abstraction," IEEE, (Year: 2011).*
Oyamada, Marcio Seiji, "Applying neural networks to performance estimation of embedded software," ScienceDirect, (Year: 2008).*
Tanaka—Accuracy Analysis of Machine Learning-Based Performance Modeling for Microprocessors (Year: 2016).*
Alves—SiNUCA_A_Validated_Micro-Architecture_Simulator (Year: 2015).*
Burger—The SimpleScalar Tool Set, Version 2.0 (Year: 1997).*
Combined Search and Examination Report for GB Application No. 1906542.4 dated Mar. 16, 2020, 13 pages.
E. Ipek et al, "Efficiently Exploring Architectural Design Spaces via Predictive Modeling" International Conference on Architectural Support for Programming Languages and Operating Systems, ASPLOS'06, Oct. 21-25, pp. 195-206.
G. Bontempi, "A Data Analysis Method for Software Performance Prediction" Proceedings of the 2002 Design, Automation and Test in Europe Conference and Exhibition (DATE'02), Mar. 2002, 6 pages.
A. Beg et al, "A Neural Model for Processor-Throughput Using Hardware Parameters and Software's Dynamic Behavior" 2012 $12^{th}$ International Conference on Intelligent Systems Design and Applications (ISDA), Nov. 2012, pp. 821-825.
M.S. Oyamada, "Applying neural networks to performance estimation of embedded software" Journal of Systems Architecture, vol. 54, Jan. 2008, pp. 22-240.
M. Oyamada et al, "Software Performance Estimation in MPSoC Design" Design Automation Conference, Jan. 2007, pp. 38-43.
S. Khakhaeng et al, "On the Finding Proper Cache Prediction Model Using Neural Network" $8^{th}$ International Conference on Knowledge and Smart Technology, Feb. 3-6, 2016, pp. 146-151.

* cited by examiner

CACHE CONFIGURATION PERFORMANCE ESTIMATION

TECHNICAL FIELD

The present technique relates to the field of data processing. More particularly it relates to the performance estimation of a cache configuration.

BACKGROUND

A data processing system may comprise a cache to store temporary copies of data items to be used by a processing unit and to reduce the latency associated with accessing the data items in memory. When planning a data processing system it may be desirable to estimate the cache performance in dependence on which of several cache configurations is adopted in order to enable a choice to be made between a range of potential cache structures which might be implemented.

SUMMARY

At least one example described herein provides a computer-implemented method of generating an estimated cache performance of a cache configuration, comprising the steps of: receiving a set of mapping coefficients for a neural network generated based on a set of training data output by a cycle-accurate simulation of at least a portion of a data processing system comprising the cache configuration; specifying a cache configuration value indicative of the cache configuration; performing a non-cycle-accurate simulation of the data processing system to determine a set of memory access parameters based on an instruction sequence of processor instructions; configuring the neural network using the set of mapping coefficients and providing the cache configuration value and the set of memory access parameters as inputs to the neural network; and generating, using the neural network, at least one cache performance value indicative of the estimated cache performance of the cache configuration.

At least one example described herein provides a method of training a neural network for estimating a cache performance of a cache configuration, comprising the steps of: generating at least one instruction sequence of processor instructions; performing a non-cycle-accurate simulation of a data processing system comprising the cache configuration to determine a corresponding set of memory access parameters for each generated instruction sequence; computing at least one expected cache performance value for each instruction sequence based on a cycle-accurate simulation of at least a portion of the data processing system; and performing an iterative neural network training operation to calculate a set of mapping coefficients for configuring the neural network using each set of memory access parameters and each corresponding at least one expected cache performance value as training data, wherein each iteration of the iterative neural network training operation updates the set of mapping coefficients based upon a comparison between at least one intermediate cache performance value generated by the neural network in a preceding iteration and the at least one expected cache performance value, and wherein the at least one intermediate cache performance value and the at least one expected cache performance value are each generated based on the same instruction sequence.

At least one example described herein provides an apparatus for estimating cache performance of a cache configuration, comprising: an input unit to receive a set of mapping coefficients for a neural network generated based on a set of training data output by a cycle-accurate simulation of at least a portion of a data processing system comprising the cache configuration and to receive a cache configuration value indicative of the cache configuration; a non-cycle-accurate simulation unit to perform a non-cycle-accurate simulation of the data processing system to determine a set of memory access parameters based on an instruction sequence of processor instructions; a neural network configuration unit to configure the neural network using the set of mapping coefficients and provide the cache configuration value and the set of memory access parameters as inputs to the neural network; and a cache performance analysis unit to generate, using the neural network, at least one cache performance value indicative of the estimated cache performance of the cache configuration.

At least one example described herein provides an apparatus for training a neural network for estimating cache performance of a cache configuration, comprising: an instruction sequence generation unit to generate at least one instruction sequence of processor instructions and perform a non-cycle-accurate simulation of a data processing system comprising the cache configuration to determine a corresponding set of memory access parameters for each generated instruction sequence; a cycle-accurate simulation unit to compute at least one expected cache performance value for each instruction sequence based on a cycle-accurate processor simulation of at least a portion of the data processing system; and a training unit to perform an iterative neural network training operation to calculate a set of mapping coefficients for configuring the neural network using each set of memory access parameters and each corresponding at least one expected cache performance value as training data, wherein each iteration of the iterative neural network training operation updates the set of mapping coefficients based upon a comparison between at least one intermediate cache performance value generated by the neural network in a preceding iteration and the at least one expected cache performance value, and wherein the at least one intermediate cache performance value and the at least one expected cache performance value are each generated based on the same instruction sequence.

BRIEF DESCRIPTION OF THE DRAWINGS

The present invention will be described further, by way of example only, with reference to embodiments thereof as illustrated in the accompanying drawings, in which.

DESCRIPTION OF EMBODIMENTS

At least one example described herein provides a computer-implemented method of generating an estimated cache performance of a cache configuration, comprising the steps of: receiving a set of mapping coefficients for a neural network generated based on a set of training data output by a cycle-accurate simulation of at least a portion of a data processing system comprising the cache configuration; specifying a cache configuration value indicative of the cache configuration; performing a non-cycle-accurate simulation of the data processing system to determine a set of memory access parameters based on an instruction sequence of processor instructions; configuring the neural network using the set of mapping coefficients and providing the cache configuration value and the set of memory access parameters as inputs to the neural network; and generating, using the neural network, at least one cache performance value indicative of the estimated cache performance of the cache configuration.

The present techniques recognise that estimating a cache performance in a proposed data processing system may be approached in various ways. On the one hand the data processing system may be simulated very closely, with a cycle-accurate simulation, giving a reliable estimation of the cache performance, but at the cost of complexity and cost of providing the cycle-accurate simulation and the time required to run such a cycle-accurate simulation. On the other hand simulation of the data processing system may be "loosely timed", with a non-cycle-accurate simulation, allowing for the simulation to be more easily provided and to be run much more quickly, but then accepting that the reliability of the estimation of the cache performance will be downgraded as a result. In this context the present techniques propose an approach which makes use of a neural network to generate at least one cache performance value as an output in response to a cache configuration value and a set of memory access parameters as inputs. Notably, the present techniques further propose that the neural network is trained using training data resulting from a cycle-accurate simulation of at least a portion of a data processing system comprising the cache configuration, but that the generation, using the trained neural network, of the at least one cache performance value indicative of the estimated cache performance of the cache configuration is performed using a set of memory access parameters which have been determined using a non-cycle-accurate simulation of the data processing system.

This approach to estimating cache performance has been found to produce more accurate estimations of cache performance than have been achievable with "loosely-timed" (non-cycle-accurate) simulations alone, but without incurring the significant cost and time overhead of running a cycle-accurate simulation each time a cache performance estimation is required. In essence the neural network captures the memory access parameter dependency and the cache configuration value dependency of the cache performance value in the cycle-accurate simulation of the data processing system and allows a good estimation of the cache performance value to be obtained for a set of memory access parameters generated from a loosely-timed (non-cycle-accurate) simulation of the data processing system.

Notably also the approach proposed by the present techniques also allows a centralization of the training of the neural network using the cycle-accurate simulation of the data processing system and a distribution of the later use of the trained neural network using the loosely simulation of the data processing system. Hence for example where one party may wish to provide a data processing system which can be implemented with a range of different cache configurations, the neural network can be trained by that party using a cycle-accurate simulation of the data processing system for different cache configurations. The trained neural network can then be provided to any number of other parties who wish to implement the data processing system. Each of those other parties can then obtain a reliable estimated cache performance for a given selected cache configuration by using the trained neural network, but using a loosely simulation of their intended data processing system to provide the inputs to the neural network. In this manner only the party providing the data processing system with the range of different cache configurations need invest the time and effort needed for the cycle-accurate simulation of the data processing system, and the other parties wishing to implement the data processing system need only each run their own loosely simulation of the data processing system.

The neural network is trained by generating a set of mapping coefficients which are used to map the inputs to the neural network to its outputs. These mapping coefficients define the configuration of the neural network and are generated based on the training data output by the cycle-accurate simulation. Note that the cycle-accurate simulation is not necessarily required to simulate the entirety of a data processing system to be implemented, but rather at least a portion of a data processing system comprising the cache configuration may be sufficient in order to accurately support the cycle-accurate simulation.

In some examples, the cache configuration value indicates a cache size of the cache configuration. The size of a cache is an attribute of a cache configuration which has a considerable impact on the cache's performance. A cache's hit rate can be improved (and its miss rate reduced) by increasing the size of the cache. However a larger cache will also occupy more space on an integrated circuit, likely reducing the space available for other system components, and will also increase the cache access latency and consume more power. Therefore the cache size is an attribute which must be selected carefully when choosing a cache configuration. The present techniques support the user in estimating the performance of a range of cache configurations, for example with different cache sizes, in order to observe, based on the cache performance value(s) which are most important, which cache configuration might be an appropriate one to select.

The set of memory access parameters determined by the non-cycle-accurate simulation provides a set of inputs to the neural network which is indicative of the way in which an instruction sequence causes memory accesses. In some examples, the set of memory access parameters comprises a load instruction distribution parameter to indicate a distribution of load instructions in the instruction sequence and a store instruction distribution parameter to indicate a distribution of store instructions in the instruction sequence. Different types of programs, as represented by different example instructions sequences, may comprise different distributions of load instructions and store instructions. Relatively frequent load and store instructions may make a larger and more efficient cache more desirable, whilst programs which have fewer of these types of instruction may have relatively less need for local caching of data items. Providing the load instruction distribution parameter and the store instruction distribution parameter as inputs to the neural network allows these factors to be taken into account. This enables the cache performance estimation to give the user an indication of how well a given cache configuration would be expected perform when executing an execution sequence with those particular instruction distribution parameters.

The particular data items to be accessed by the load and store instructions, and in particular the storage locations of those data items, may also have a significant influence on the suitability of the cache configuration. Therefore, in some examples, the set of memory access parameters further comprises at least one of: a spatial locality parameter indicative of the spatial locality of data in memory to be accessed by the instruction sequence; and a reuse distance parameter indicative of a reuse rate of data accessed by instructions in the instruction sequence. The spatial locality of data (the extent to which data accessed by the instruction sequence are located at proximate storage locations) may be a factor in determining cache performance. For example, multiple items of data within a single cache line would correspond to high spatial locality and efficient cache usage. More disperse data items, each causing its own cache line allocation, would correspond to low spatial locality and notably less efficient cache usage. Therefore, the present techniques allow the cache performance of a given cache configuration to be estimated allowing for the spatial locality of data in memory to be accessed by an instruction sequence. Further, particular data items may be repeatedly accessed by certain instruction sequences. For example, some programs comprise a loop which may access a given memory address with each iteration. However, other programs may only load or store a given data item once, such as when loading or storing video data. A reuse distance parameter provides an indication of the rate at which a given item of data is "reused" (re-accessed) by instructions in the instruction sequence. By providing the reuse distance parameter a more accurate cache performance estimation is supported.

In order to select an appropriate cache configuration, the user may be provided with various parameters to characterise the estimated performance of the cache configuration. In some examples, the at least one cache performance value comprises an instruction cache access rate value and an instruction cache miss rate value. The instruction cache access rate value is a value which provides an indication of the rate (frequency) of instruction cache accesses. By providing this as a measure of the cache performance, the user is provided with an indication of whether instructions can be accessed at a required rate when executing the instruction sequence. The instruction cache miss rate value provides an indication of the rate at which instructions which are requested from an instruction cache are not found in the instruction cache and thus need to be retrieved from a further cache level or indeed from memory. Instruction cache misses are a significant source of performance loss and hence the user of the present techniques will be able to determine the suitability of the cache configuration with improved accuracy by knowing the rate of instruction cache misses.

In addition to the instruction cache, accessing a data cache of the cache configuration may also be an important part of a data processing system. Therefore, in order to more fully understand the performance of the cache configuration, it is advantageous to estimate the performance of the data cache. Accordingly in some examples, the at least one cache performance value comprises a data cache access rate value and a data cache miss rate value. The data cache access rate value is a value which provides an indication of the rate of data cache accesses. By providing this as a measure of performance, the user is able to estimate whether data can be accessed at the required rate when executing the instruction sequence. The data cache miss rate value provides an indication of the rate at which data requested from the data cache is not found in the data cache and so needs to be accessed from a further cache level or indeed from memory. Data cache misses can significantly reduce the performance of some programs. A larger cache size may alleviate this, by reducing the cache miss rate. By providing an indication of the data cache miss rate, the user of the present technique may be able to determine whether the cache configuration meets the necessary data access rate requirements.

Some cache configurations comprise a plurality of cache levels. Typically, further levels of cache in a hierarchical cache structure are larger than the previous cache level, yet are slower to access. In some examples, the cache configuration comprises a hierarchical cache structure comprising a first level cache and a second level cache. For cache configurations which comprise a secondary cache level, there may be a need to determine the performance of the cache configuration in terms of the effectiveness of the secondary cache level. Therefore, in order to accurately estimate the performance of a cache configuration, the at least one cache performance value comprises a secondary cache level access rate value and a secondary cache level miss rate value. The secondary cache level access rate value is a value which provides an indication of the rate of secondary cache level accesses. By providing this as a measure of performance, the user is able to estimate the usage of the secondary cache when executing the instruction sequence. The secondary cache level miss rate value provides an indication of the rate at which data requested from the second level cache is not found in the second level cache and so needs to be accessed in a further cache level or in memory. This enables the user to assess the performance of the cache configuration more accurately by being able to determine usage of the second level cache. For example, if the second level cache is used more often than might otherwise be expected (as indicated by the secondary cache level access rate value), this may indicate that the size of a first level cache should be increased. Likewise, if the second level cache is too small, this may be reflected by a high secondary cache level miss rate value. Thus, the user of the present technique is able to more accurately determine the suitability of more than one cache level in the cache configuration.

The at least one cache performance value is generated using the neural network which acts as a set of mapping functions between its inputs and the generated at least one cache performance value as its output. In some examples of a neural network used according to the present techniques, the neural network comprises an input layer, a hidden layer and an output layer, wherein a value at each of a plurality of input nodes at the input layer is based on at least one of the cache configuration value and the set of memory access parameters, wherein a value at each of at least one output node at the output layer corresponds to the at least one cache performance value, and wherein the hidden layer comprises at least one mapping function defined by the set of mapping coefficients. The input layer comprises a plurality of input nodes which allow a mapping of the at least one cache configuration value and the set of memory access parameters to the hidden layer. Most generally, each input node is mapped to each hidden layer node by a weighting function, and a value is constructed at each hidden layer node as a weighted sum of the values received from each input node. Further, the hidden layer may comprise a plurality of hidden layer nodes which are, generally, each mapped to each output node at the output layer by a weighting function, and a value is constructed at each output layer node as a weighted sum of the values received from each hidden layer node. The at least one cache performance values are generated according to the values thus generated at the output layer. By providing a neural network comprising the input layer, the hidden layer and the output layer, it is possible to provide a set of mapping functions which map the values of the at least one cache configuration value and the set of memory access parameters to the at least one cache performance values based on a trained mapping function. Some mapping functions may provide only two layers (i.e. an input layer and an output layer), however by providing a hidden layer, it is possible to more accurately estimate the performance of the cache configuration.

In some examples, the non-cycle-accurate simulation (used when employing the trained neural network to estimate cache performance) is of at least a portion of the data processing system simulated by the cycle-accurate simulation (when training the neural network). The extent to which the data processing system is simulated by each simulation may vary, depending on the requirements of each to support the simulation.

As mentioned above the cache configuration may comprise a plurality of separate cache levels, such as a first level cache and a second level cache. Therefore, the at least one cache configuration value may be indicative of the sizes of more than one cache level. For example, if the cycle-accurate simulation models a two level hierarchical cache configuration, the at least one cache configuration value may indicate the size of each cache level. Hence, in some examples, the method further comprises specifying more than one cache configuration value indicative of the cache configuration. By enabling the user of the present technique to specify more than one cache configuration value, it is possible to estimate the performance of a greater variety of cache configurations, such as cache configurations of a hierarchical cache structure with more than one cache level.

In some examples, the set of mapping coefficients are determined by an iterative neural network training operation, wherein each iteration of the iterative neural network training operation updates the set of mapping coefficients based upon a comparison between at least one intermediate cache performance value generated by the neural network in a preceding iteration and at least one expected cache performance value generated by the cycle-accurate simulation, and wherein the at least one intermediate cache performance value and at least one expected cache performance value are each generated based on the same instruction sequence. By performing the training operation iteratively, the mapping coefficients of the neural network can be evolved to a configuration in which the neural network can reliably translate a set of memory access parameters and a cache configuration value into at least one cache performance value indicative of the cache performance of the cache configuration in the cycle accurate simulation. This set of mapping coefficients of the neural network can then be used in association with the non-cycle-accurate simulation to estimate cache performance of a given cache configuration (and for a given set of memory access parameters). Based on the difference between the at least one intermediate cache performance value and at least one expected cache performance value, the training operation may use an update process, such as a back-propagation process, in order to propagate a set of update values to the current set of mapping coefficients in order to update them. By performing this iterative neural network training and updating operation the accuracy of the neural network in generating the at least one cache performance value is supported.

At least one example described herein provides a method of training a neural network for estimating a cache performance of a cache configuration, comprising the steps of: generating at least one instruction sequence of processor instructions; performing a non-cycle-accurate simulation of a data processing system comprising the cache configuration to determine a corresponding set of memory access parameters for each generated instruction sequence; computing at least one expected cache performance value for each instruction sequence based on a cycle-accurate simulation of at least a portion of the data processing system; and performing an iterative neural network training operation to calculate a set of mapping coefficients for configuring the neural network using each set of memory access parameters and each corresponding at least one expected cache performance value as training data, wherein each iteration of the iterative neural network training operation updates the set of mapping coefficients based upon a comparison between at least one intermediate cache performance value generated by the neural network in a preceding iteration and the at least one expected cache performance value, and wherein the at least one intermediate cache performance value and the at least one expected cache performance value are each generated based on the same instruction sequence.

At least one example described herein provides an apparatus for estimating cache performance of a cache configuration, comprising: an input unit to receive a set of mapping coefficients for a neural network generated based on a set of training data output by a cycle-accurate simulation of at least a portion of a data processing system comprising the cache configuration and to receive a cache configuration value indicative of the cache configuration; a non-cycle-accurate simulation unit to perform a non-cycle-accurate simulation of the data processing system to determine a set of memory access parameters based on an instruction sequence of processor instructions; a neural network configuration unit to configure the neural network using the set of mapping coefficients and provide the cache configuration value and the set of memory access parameters as inputs to the neural network; and a cache performance analysis unit to generate, using the neural network, at least one cache performance value indicative of the estimated cache performance of the cache configuration.

At least one example described herein provides an apparatus for training a neural network for estimating cache performance of a cache configuration, comprising: an instruction sequence generation unit to generate at least one instruction sequence of processor instructions and perform a non-cycle-accurate simulation of a data processing system comprising the cache configuration to determine a corresponding set of memory access parameters for each generated instruction sequence; a cycle-accurate simulation unit to compute at least one expected cache performance value for each instruction sequence based on a cycle-accurate processor simulation of at least a portion of the data processing system; and a training unit to perform an iterative neural network training operation to calculate a set of mapping coefficients for configuring the neural network using each set of memory access parameters and each corresponding at least one expected cache performance value as training data, wherein each iteration of the iterative neural network training operation updates the set of mapping coefficients based upon a comparison between at least one intermediate cache performance value generated by the neural network in a preceding iteration and the at least one expected cache performance value, and wherein the at least one intermediate cache performance value and the at least one expected cache performance value are each generated based on the same instruction sequence.

Some particular embodiments will now be described with reference to the figures.

Figure 1:
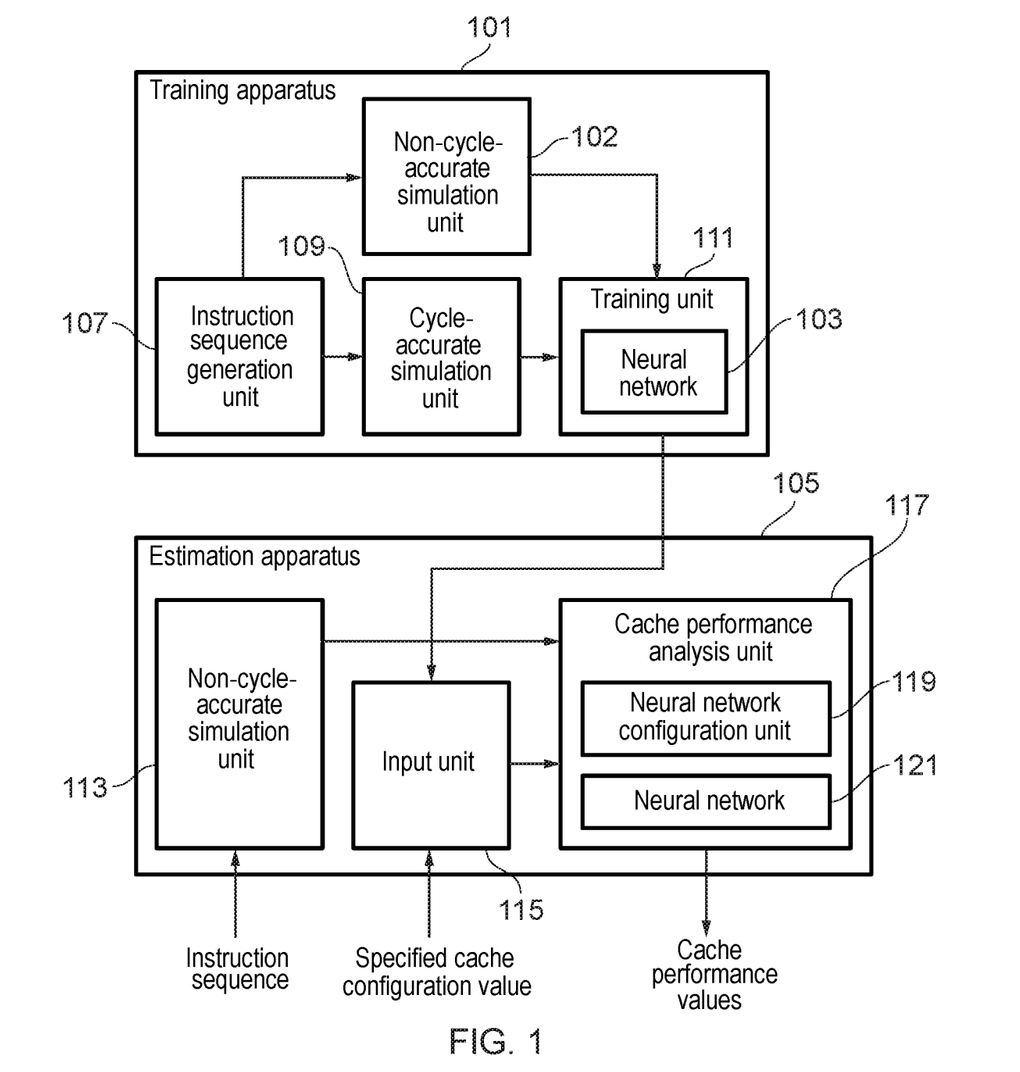
FIG. 1 illustrates a system overview of a training apparatus to train a neural network and an estimation apparatus to estimate cache performance using the trained neural network.

FIG. 1 illustrates an overview of a system comprising a training apparatus 101 to train a neural network 103 and an estimation apparatus 105 to estimate cache performance using a trained neural network 121. Each of the training apparatus 101 and the estimation apparatus 105 may be provided as general purpose computing devices programmed to perform these respective functions or at least one of them could be provided as a dedicated device configured appropriately. The training apparatus 101 comprises an instruction sequence generation unit 107, a cycle-accurate simulation unit 109, a non-cycle-accurate simulation unit 102, and a training unit 111. The instruction sequence generation unit 107 is arranged to generate a sequence of program instructions to be executed by a processor. In particular, the instruction sequence generation unit 107 is arranged to generate diverse and differing sequences of program instructions. It should be noted that whilst these sequences could be generated to represent typical code sequences which might be encountered, the approach taken here is to generate code sequences which do not have any data processing purpose, but rather are intentionally constructed to exhibit a diverse range of memory access characteristics. That is to say, the sequences of program instructions are generated with the explicit purpose of training the neural network and are generated to explore "corner cases" of operation for the cache configuration to ensure that the trained neural network can accurately reflect the behaviour of the cache configuration for a wide range of use examples.

An instruction sequence generated by the instruction sequence generation unit 107 is provided both to the cycle-accurate simulation unit 109, which performs a cycle-accurate simulation of a data processing system executing that instruction sequence, and to the non-cycle-accurate simulation unit 102, which performs a loosely timed simulation of a data processing system executing that instruction sequence. The cycle-accurate and non-cycle accurate simulations are used to determine a set of training data for the neural network 103 based on the instruction sequence provided by the instruction sequence generation unit 107. A set of training data thus comprises, on the one hand, at least one cache performance value generated by the cycle-accurate simulation unit 109 simulating a data processing system executing the instruction sequence. On the other hand the training data also comprises a set of memory access parameters generated by the non-cycle-accurate simulation unit 102 simulating a data processing system executing the instruction sequence.

The training unit 111 comprises a neural network 103 to be trained by the training unit 111 based on the training data provided. The training unit is arranged to perform an iterative neural network training operation to calculate a set of mapping coefficients, i.e. the weights between the nodes of the neural network, which accurately translate the set of memory access parameters generated by the non-cycle-accurate simulation unit 102 (and at least one cache configuration parameter) into the at least one cache performance value generated by the cycle-accurate simulation unit 109. The training is iteratively performed, such that each iteration of the iterative neural network training operation updates a current set of mapping coefficients used by the neural network. The update is based on a comparison between the target at least one cache performance value (from the cycle-accurate simulation) and at least one intermediate cache performance value generated by the neural network using the current set of mapping coefficients.

When the iterative neural network training operation is complete the training apparatus 101 can output the set of mapping coefficients defining the trained neural network from the training unit 111 to the estimation apparatus 105. The estimation apparatus 105 comprises a non-cycle-accurate simulation unit 113, an input unit 115, and a cache performance analysis unit 117. The cache performance analysis unit 117 comprises a neural network configuration unit 119 and a neural network 121. In operation, in order to estimate a given cache configuration performance, the non-cycle-accurate simulation unit 113 is provided with an instruction sequence. The instruction sequence provided to the non-cycle-accurate simulation unit 113 may be an artificially constructed instruction sequence (as described above for the purposes of training the neural network) or alternatively could be a specific "real" instruction set for which the user wishes to evaluate a given cache configuration. The non-cycle-accurate simulation unit 113 is thus arranged to perform a non-cycle-accurate simulation (matching that of the non-cycle-accurate simulation unit 102) of the instruction sequence in order to generate a set of memory access parameters indicative of the memory access behaviour as a result of the instruction sequence. This set of memory access parameters is provided to the cache performance analysis unit 117 to be used to perform cache performance analysis for one or more given cache configurations. The input unit 115 comprised within the estimation apparatus 105 is arranged to both receive the output set of mapping coefficients from the training unit 111 of the training apparatus 101 and to receive a specified cache configuration value from a user. The specified cache configuration value is indicative of the cache configuration to be estimated regarding its performance. The neural network configuration unit 119 of the cache performance analysis unit 117 configures a neural network 121 on the basis of the set of mapping coefficients provided by the training unit 111. Once the neural network 121 has been configured, the cache performance analysis unit provides, as inputs to the neural network 121, the set of memory access parameters and the specified cache configuration value. The cache performance analysis unit 117 then generates an output using the neural network 121 in order to determine at least one cache performance value. The at least one cache performance value indicates the performance of the cache configuration as specified by the specified cache configuration value. The at least one cache performance value can then be considered by a user of the present technique or used by a further process in order to analyse the suitability of the cache configuration for the intended application of the cache structure.

Figure 2:
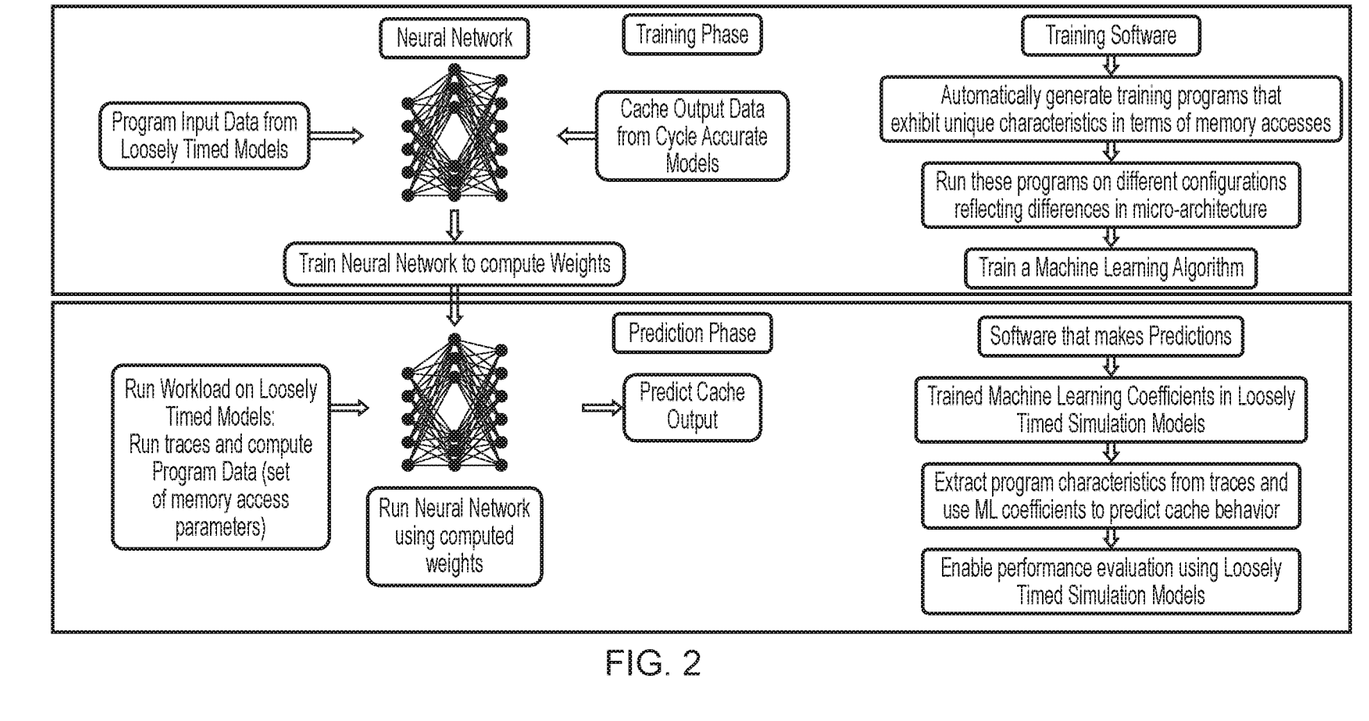
FIG. 2 illustrates a training phase and a prediction phase of the present techniques.

FIG. 2 schematically illustrates the two phases in which a neural network is used by the present techniques. In the upper part of the figure an initial "training phase" is shown, in which the neural network is trained, making use of both loosely timed models and cycle-accurate models. In the lower part of the figure an later "prediction phase" is shown, in which the trained neural network is used to make predictions of cache performance for a given configuration. The benefit of this two-stage process can be appreciated when it is borne in mind that although cycle accurate models allow accurate prediction of cache behaviour in terms of access rates and hit rates, their simulation speed is typically relatively slow (e.g. at 10 s of kHz), whereas loosely timed models, although running much faster (e.g. at 100 s of MHz) generally can only poorly predict cache performance.

Figure 3:
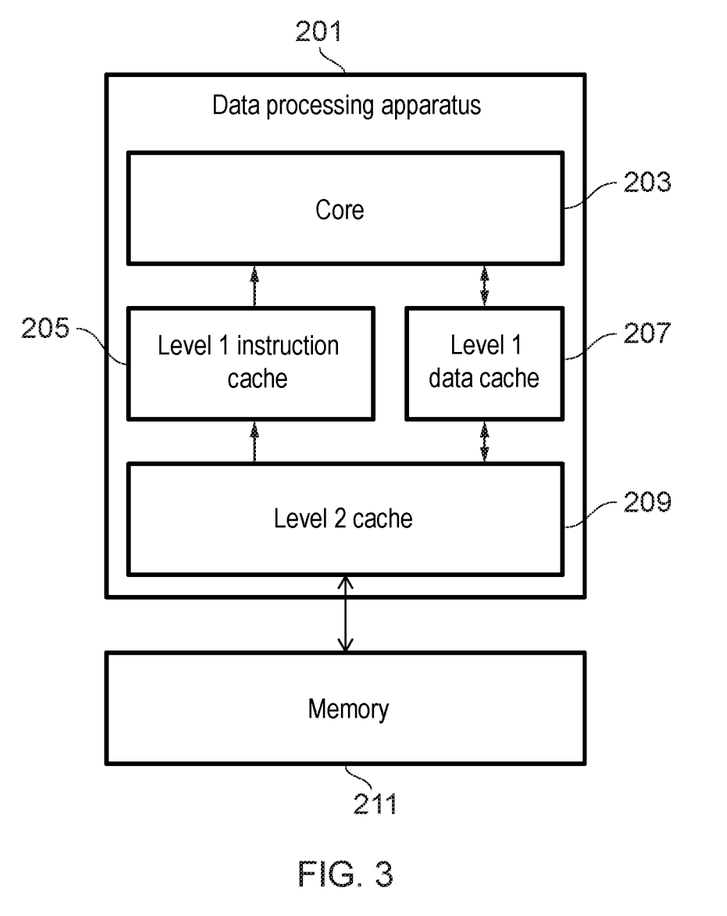
FIG. 3 illustrates a data processing apparatus with a hierarchical cache configuration.

FIG. 3 illustrates a data processing apparatus 201 comprising a hierarchical cache configuration. The data processing apparatus 201 comprises a processor core 203 (data processing unit) used by the data processing apparatus to execute a sequence of instructions. The data processing apparatus 201 further comprises a level one (L1) instruction cache 205, a level one (L1) data cache 207 and a combined level two (L2) cache 209. In executing instructions the data processing apparatus 201 may perform memory accesses, such as load operations and store operations, by accessing memory 211. The level one instruction cache 205 is arranged to store instructions to be executed by the core 203. These instructions may be proactively fetched from memory 201 in advance of their first use and may remain in the L1 instruction cache when repeatedly used by the core 203. Similarly, the L1 data cache 207 is arranged to store copies of data items loaded from memory 211. The L2 cache 209 is also arranged to store copies of instruction and data items retrieved from memory 211 and is typically somewhat larger than either the L1 instruction cache 205 or the L1 data cache 207. The hierarchical cache configuration shown in FIG. 2 comprises the level one instruction cache 205, the level one data cache 207 and the level two cache 209, and is an example of a cache structure specified by a cache configuration.

Figure 4:
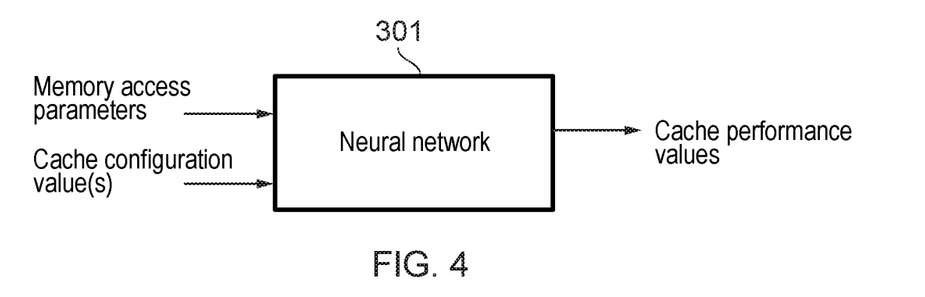
FIG. 4 illustrates a neural network according to one example of the present technique for estimating cache performance values.

FIG. 4 schematically illustrates a neural network 301 which is arranged to receive memory access parameters and at least one cache configuration value, and to output at least one cache performance value. The neural network 301 may be implemented in a variety of ways with which one of ordinary skill in the art is familiar and a detailed description thereof is dispensed with merely for the purpose of brevity. In addition the neural network 301 may be provided with more than one cache configuration value such as a cache configuration value corresponding to a size of each level of a hierarchical cache structure. The neural network 301 may therefore be configured to estimate cache performances of a range of cache configurations depending on the cache configurations being considered by the user. Once the neural network 301 is trained by the training apparatus 101, a user of the estimation apparatus 105 (which comprises a configured neural network, such as that illustrated in FIG. 4), is able to generate at least one cache performance value to provide an indication of the performance of the cache configuration using a number of criteria. Therefore, the at least one cache performance value output by the neural network 301 may comprise more than one cache performance value each providing an indication of different aspects of performance of a cache configuration, as will be described further with reference to FIG. 5.

Figure 5:
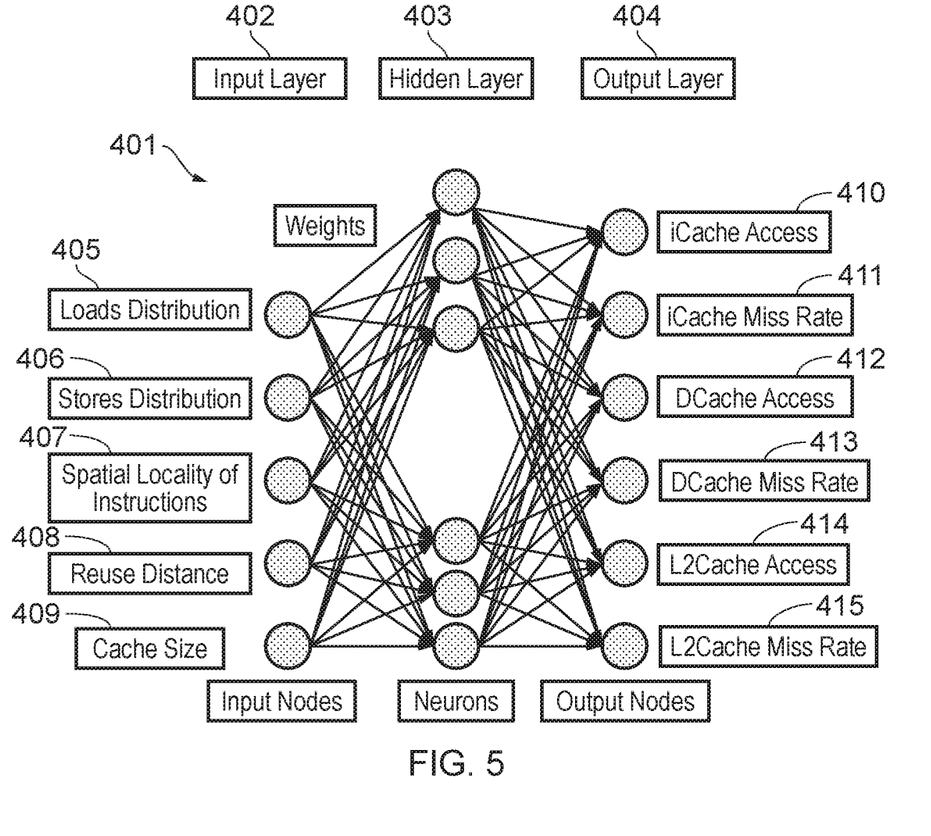
FIG. 5 shows a more detailed example of a neural network according to one example of the present technique.

FIG. 5 illustrates an example of a neural network 401 comprising three layers. The neural network 401 comprises an input layer 402, a hidden layer 403, and an output layer 404. The input layer 402 comprises a plurality of input nodes, each of which are arranged to be set according to the value of a given input value characterizing the cache configuration or the instruction sequence. In this example, the plurality of input nodes are provided with: a loads distribution value 405 (load instruction distribution parameter), a stores distribution value 406 (store instruction distribution parameter), a spatial locality parameter 407, a reuse distance parameter 408 and a cache size value 409. The loads distribution value 405 indicates a distribution of load instructions in the instruction sequence and the stores distribution value 406 indicates a distribution of store instructions in the instruction sequence. The spatial locality parameter 407 provides an indication of the spatial locality of data in memory to be accessed by instructions in the instruction sequence, and a reuse distance parameter 408 provides an indication of the rate of reuse (re-access) of data items accessed by instructions in the instruction sequence. The cache size 409 provides an indication of the size of the cache whose performance is estimated by a current use of the estimation apparatus 105.

As shown in FIG. 5, the neural network also comprises a hidden layer 403 with a plurality of hidden nodes (neurons), which are used to hold a plurality of values constructed on the basis of the values at the input nodes and an on the basis of which the values at the output nodes are generated. The values at each of the input nodes are supplied to at least one of the hidden layer nodes (all in the example of FIG. 4) and are weighted by a plurality of respective weights (i.e. mapping coefficients). Similarly the values at each of the hidden nodes are supplied to at least one of the output layer nodes (all in the example of FIG. 4) and are weighted by a plurality of respective weights (i.e. mapping coefficients).

The output nodes are adapted to provide the estimated cache performance values, such as an instruction cache access rate value 410, an instruction cache miss rate value 411, a data cache access rate value 412, a data cache miss rate value 413, a level two cache access rate value 414 and a level two cache miss rate value 415. These respective values may be directly the values generated by the neural network for the corresponding nodes of the output layer, or may be derived therefrom (e.g. scaled, offset, etc.). The values at the output nodes of the output layer 404 of the neural network are generated by the neural network on the basis of the set of mapping coefficients (i.e. weights) provided to the input unit 115 of the estimation apparatus 105 as determined by the training unit 111 of the training apparatus 101. The values at the output nodes of the output layer 404 are the at least one cache performance value generated by the neural network 103 and provide an indication the performance of the cache configuration. For example the instruction cache access rate value 410, the data cache access rate value 412, and the level two cache access rate value 414 provide an indication of the rate of cache accesses for their respective caches in a hierarchical cache structure. Further, the instruction cache miss rate value 411, the data cache miss rate value 413, and the level two cache miss rate value 415 each provide an indication of the frequency of cache misses for their respective caches in the hierarchical cache structure. By providing these characteristic values a user is able to identify more effectively the suitability of the cache configuration with regards to its intended use.

Figure 6:
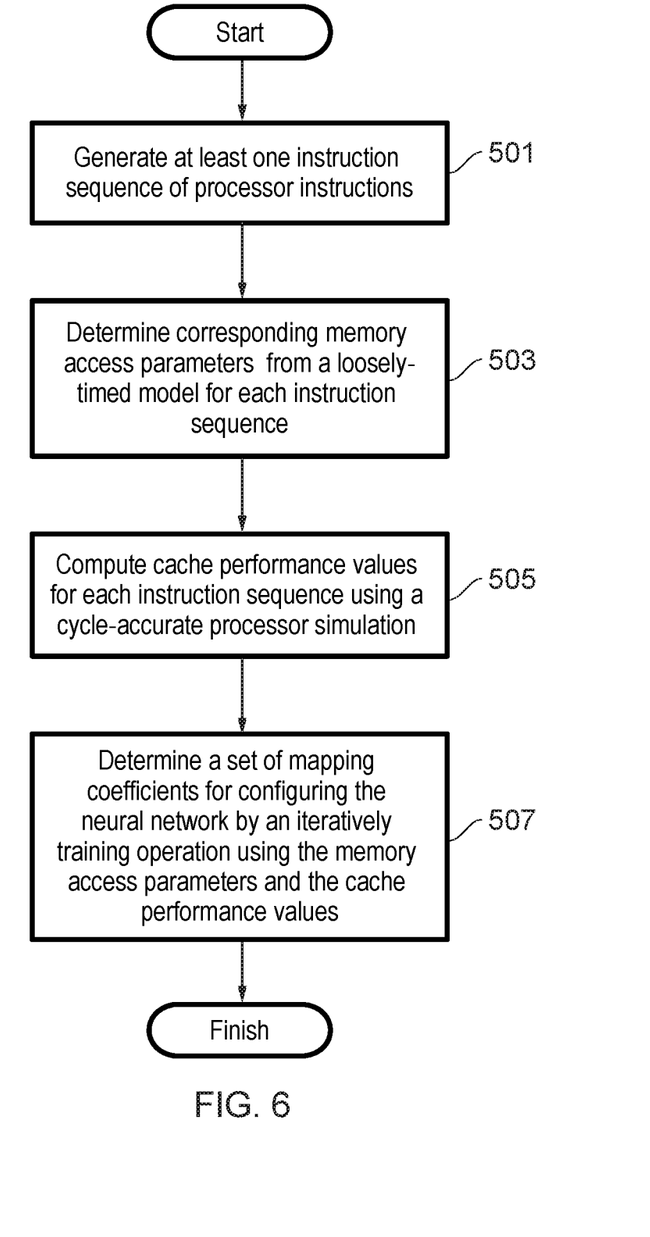
FIG. 6 is a flow diagram showing a method of training a neural network for estimating cache performance.

FIG. 6 is a flow diagram illustrating an example of a method of training the neural network 103 for estimating cache performance. The method begins at step 501, at which at least one instruction sequence of processor instructions is generated. At step 503 the method determines the corresponding set of memory access parameters for each instruction sequence using a loosely timed (non-cycle-accurate) model. At step 505, cache performance values for each instruction sequence are computed using a cycle-accurate processor simulation, and at step 507 a set of mapping coefficients are determined which are used to configure the neural network. The set of mapping coefficients are generated at step 507 by using an iterative process of updating them based on a training operation using the set of memory access parameters as neural net inputs and the cache performance values as neural net outputs. The updating of the set of mapping coefficients is performed based on a comparison between a set of intermediate cache performance values and the target cache performance values. Upon completion of the calculation of the set of mapping coefficients, the training operation is complete and the calculated set of mapping coefficients can be transmitted to the estimation apparatus 105 for cache performance analysis.

Figure 7:
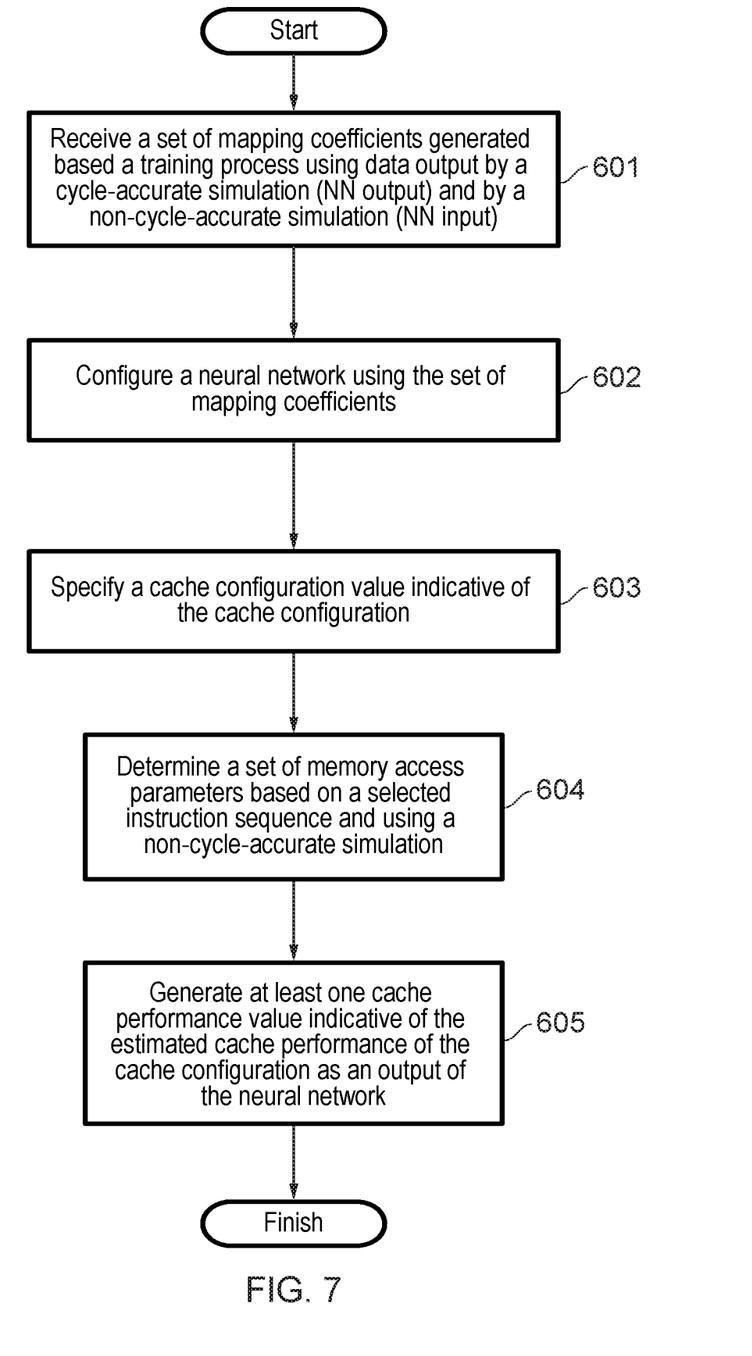
FIG. 7 is a flow diagram showing a method of estimating cache performance for a given cache configuration based on the output of a trained neural network.

FIG. 7 is a flow diagram showing a method of estimating cache performance for a given cache configuration using the trained neural network. At step 601 a set of mapping coefficients are received (defining the trained neural network) which have been generated as described in FIG. 6. At step 602, a neural network is configured (by the neural network configuration unit 119) using the received mapping coefficients. At step 603 the method specifies a cache configuration value which characterises the cache configuration. This cache configuration value may be specified by a user or another process which uses the present technique. Next, at step 604, a set of memory access parameters is determined based on a selected instruction sequence and using a non-cycle-accurate simulation. This set of memory access parameters provides an indication of the nature of the memory accesses which the instructions of the instruction sequence perform. Finally, at step 605, the cache configuration value and the set of memory access parameters are provided as inputs to the neural network and at least one cache performance value is generated indicative of the estimated cache performance of the cache configuration.

Figure 8:
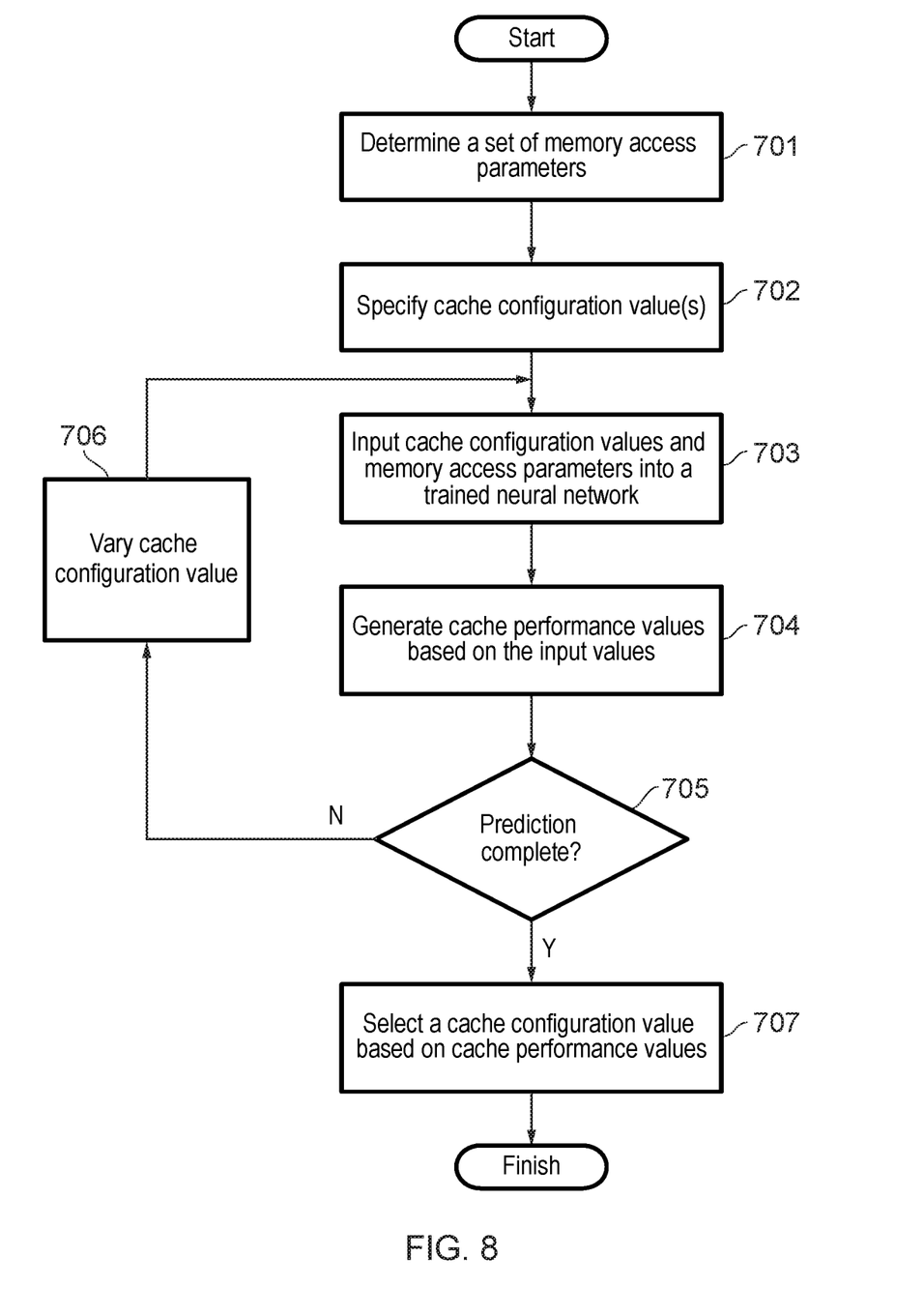
FIG. 8 is a flow diagram showing a method of estimating cache performance of a plurality of cache configurations.

FIG. 8 is a flow diagram which illustrates an example method of estimating cache performance of a plurality of cache configurations. Firstly, at step 701 the memory access parameters to be used in the estimation are determined. These may be determined by a non-cycle-accurate simulation unit based on an instruction sequence provided by the user as described above. At step 702, at least one cache configuration value is specified by the user to indicate a configuration of the cache whose performance is to be estimated. At step 703 the cache configuration value or cache configuration values are provided as an input to a trained neural network along with the set of memory access parameters determined at step 701. At step 704, the cache performance values are generated by the neural network based on the input values provided at step 703. These cache performance values indicate the performance of the cache configuration as characterised by the specified cache configuration value(s) specified at step 702. At step 705 it is determined whether the prediction of a suitable cache configuration is complete. The estimation may for example be perform cache performance analysis on a large number of different cache configuration values. If it is determined at step 705 that the estimation is not complete then, at step 706, the cache configuration value may be varied, for example the cache size may be incremented. A subsequent cache performance analysis is then performed on the basis of the new cache configuration value. In this case the varied cache configuration value (varied at step 706) is input into the trained neural network along with the set of memory access parameters. At each subsequent iteration of this estimation process a corresponding set of at least one cache performance value is generated based on the input values to the neural network at steps 703 and 704. However, if it is determined that the prediction process is complete at step 705, then the method proceeds to step 707 at which point a cache configuration value is selected (by user selection or by an automated algorithm) based on the cache performance values generated. This selection is performed based on the requirements of a cache in a given data processing apparatus.

Figure 9:
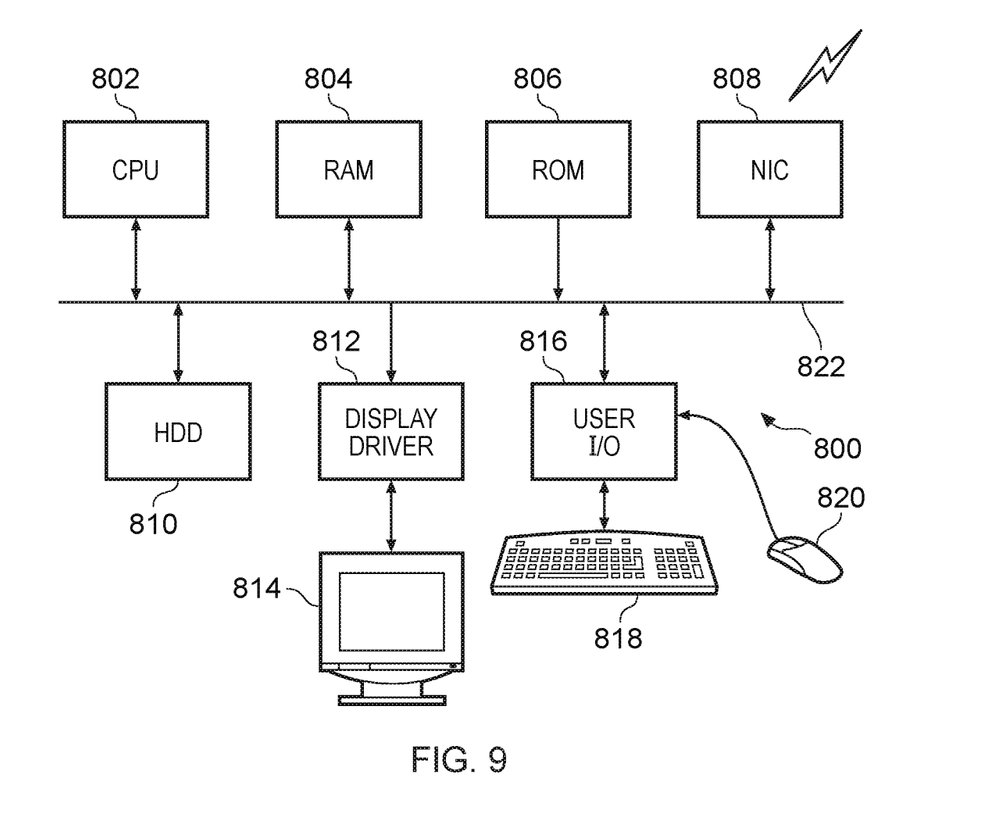
FIG. 9 schematically illustrates a general purpose computer 800 of the type that may be used to implement the above described techniques

FIG. 9 schematically illustrates a general purpose computer 800 of the type that may be used to implement the above described techniques. The general purpose computer 800 includes a central processing unit 802, a random access memory 804, a read only memory 806, a network interface card 808, a hard disk drive 810, a display driver 812, a monitor 814 and a user input/output circuit 816 with a keyboard 818 and mouse 820 all connected via a common bus 822. In operation the central processing unit 802 will execute computer program instructions that may be stored in one or more of the random access memory 804, the read only memory 806 and the hard disk drive 810 or dynamically downloaded via the network interface card 808. The results of the processing performed may be displayed to a user via the display driver 812 and the monitor 814. User inputs for controlling the operation of the general purpose computer 800 may be received via the user input output circuit 816 from the keyboard 818 or the mouse 820. It will be appreciated that the computer program could be written in a variety of different computer languages. The computer program may be stored and distributed on a recording medium or dynamically downloaded to the general purpose computer 800. When operating under control of an appropriate computer program, the general purpose computer 800 can perform the above described techniques, i.e. in particular could either act as either or both of the training apparatus 101 and the estimation apparatus 105 of FIG. 1. The architecture of the general purpose computer 800 could vary considerably and FIG. 9 is merely one example.

Alternatively, the above-described techniques may be implemented in a more distributed fashion, wherein the general purpose computer 800 illustrated in FIG. 9 may be expanded and/or replaced by an infrastructure comprising components implemented on separate physical devices, the separate physical devices sharing the processing required to carry out these techniques. Such separate physical devices may be physically proximate to one another, or may even be located at entirely different physical locations. In some configurations such an infrastructure is termed a 'cloud computing' arrangement.

In brief overall summary computer-implemented methods using machine learning are provided for generating an estimated cache performance of a cache configuration. A neural network is trained using, as inputs, a set of memory access parameters generated from a non-cycle-accurate simulation of a data processing system comprising the cache configuration and a cache configuration value, and using, as outputs, cache performance values generated by a cycle-accurate simulation of the data processing system comprising the cache configuration. The trained neural network is then provided with sets of memory access parameters generated from a non-cycle-accurate simulation of a proposed data processing system and a selected cache configuration and generates estimated cache performance values for that selected cache configuration.

In the present application, the words "configured to . . . " or "arranged to" are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" or "arranged to" does not imply that the apparatus element needs to be changed in any way in order to provide the defined operation.

Although illustrative embodiments have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

The invention claimed is:

1. A computer-implemented method of generating an estimated cache performance of a cache configuration, comprising the steps of:
 receiving a set of mapping coefficients for a neural network generated based on a set of training data output by a cycle-accurate simulation of at least a portion of a data processing system comprising the cache configuration;
 specifying a cache configuration value indicative of the cache configuration;
 performing a non-cycle-accurate simulation of the data processing system to determine a set of memory access parameters based on an instruction sequence of processor instructions;
 configuring the neural network using the set of mapping coefficients and providing the cache configuration value and the set of memory access parameters produced by the non-cycle-accurate simulation of the data processing system as inputs to the neural network; and
 generating, using the neural network, at least one cache performance value indicative of the estimated cache performance of the cache configuration.

2. The method of claim 1, wherein the cache configuration value indicates a cache size of the cache configuration.

3. The method of claim 1, wherein the set of memory access parameters comprises a load instruction distribution parameter to indicate a distribution of load instructions in the instruction sequence and a store instruction distribution parameter to indicate a distribution of store instructions in the instruction sequence.

4. The method of claim 1, wherein the set of memory access parameters further comprises at least one of:
 a spatial locality parameter indicative of the spatial locality of data in memory to be accessed by the instruction sequence; and
 a reuse distance parameter indicative of a reuse rate of data accessed by instructions in the instruction sequence.

5. The method of claim 1, wherein the at least one cache performance value comprises an instruction cache access rate value and an instruction cache miss rate value.

6. The method of claim 1, wherein the at least one cache performance value comprises a data cache access rate value and a data cache miss rate value.

7. The method of claim 1, wherein the cache configuration comprises a hierarchical cache structure comprising a first level cache and a second level cache,
 wherein the at least one cache performance value comprises a secondary cache level access rate value and a secondary cache level miss rate value.

8. The method of claim 1, wherein the neural network comprises an input layer, a hidden layer and an output layer,
 wherein a value at each of a plurality of input nodes at the input layer is based on at least one of the cache configuration value and the set of memory access parameters,
 wherein a value at each of at least one output node at the output layer corresponds to the at least one cache performance value, and
 wherein the hidden layer comprises at least one mapping function defined by the set of mapping coefficients.

9. The method of claim 1, wherein the non-cycle-accurate simulation is of the at least a portion of the data processing system simulated by the cycle-accurate simulation.

10. The method of claim 1, further comprising specifying more than one cache configuration value indicative of the cache configuration.

11. The method of claim 1, wherein the set of mapping coefficients are determined by an iterative neural network training operation,
 wherein each iteration of the iterative neural network training operation updates the set of mapping coefficients based upon a comparison between at least one intermediate cache performance value generated by the neural network in a preceding iteration and at least one expected cache performance value generated by the cycle-accurate simulation, and
 wherein the at least one intermediate cache performance value and at least one expected cache performance value are each generated based on the same instruction sequence.

12. A method of training a neural network for estimating a cache performance of a cache configuration, comprising the steps of:
 generating at least one instruction sequence of processor instructions;
 performing a non-cycle-accurate simulation of a data processing system comprising the cache configuration to determine a corresponding set of memory access parameters for each generated instruction sequence;
 computing at least one expected cache performance value for each instruction sequence based on a cycle-accurate simulation of at least a portion of the data processing system; and
 performing an iterative neural network training operation to calculate a set of mapping coefficients for configuring the neural network using each set of memory access parameters and each corresponding at least one expected cache performance value produced by the non-cycle-accurate simulation of the data processing system as training data,
 wherein each iteration of the iterative neural network training operation updates the set of mapping coefficients based upon a comparison between at least one intermediate cache performance value generated by the neural network in a preceding iteration and the at least one expected cache performance value, and
 wherein the at least one intermediate cache performance value and the at least one expected cache performance value are each generated based on the same instruction sequence.

13. An apparatus for estimating cache performance of a cache configuration, comprising a memory and at least one processor configured to perform operations comprising:
 receiving a set of mapping coefficients for a neural network generated based on a set of training data output by a cycle-accurate simulation of at least a portion of a data processing system comprising the cache configuration and receiving a cache configuration value indicative of the cache configuration;

performing a non-cycle-accurate simulation of the data processing system to determine a set of memory access parameters based on an instruction sequence of processor instructions;

configuring the neural network using the set of mapping coefficients and provide the cache configuration value and the set of memory access parameters produced by the non-cycle-accurate simulation of the data processing system as inputs to the neural network; and generating, using the neural network, at least one cache performance value indicative of the estimated cache performance of the cache configuration.

14. An apparatus for training a neural network for estimating cache performance of a cache configuration, comprising a memory and at least one processor configured to perform operations comprising:

generating at least one instruction sequence of processor instructions and performing a non-cycle-accurate simulation of a data processing system comprising the cache configuration to determine a corresponding set of memory access parameters for each generated instruction sequence;

computing at least one expected cache performance value for each instruction sequence based on a cycle-accurate processor simulation of at least a portion of the data processing system; and performing an iterative neural network training operation to calculate a set of mapping coefficients for configuring the neural network using each set of memory access parameters and each corresponding at least one expected cache performance value produced by the non-cycle-accurate simulation of the data processing system as training data, wherein each iteration of the iterative neural network training operation updates the set of mapping coefficients based upon a comparison between at least one intermediate cache performance value generated by the neural network in a preceding iteration and the at least one expected cache performance value, and wherein the at least one intermediate cache performance value and the at least one expected cache performance value are each generated based on the same instruction sequence.

* * * * *